Sept. 1, 1964

R. G. MILLHISER ETAL 3,146,550

ABRASIVE BLASTING MACHINE

Filed July 7, 1961

INVENTORS
ROBERT G. MILLHISER
NICHOLAS PANZICA
BY EMIL UMBRICHT
DEWEY M. EVANS

Curtis, Morris, & Safford
ATTORNEYS

Sept. 1, 1964  R. G. MILLHISER ETAL  3,146,550
ABRASIVE BLASTING MACHINE
Filed July 7, 1961  9 Sheets-Sheet 4

Fig. 4

INVENTORS
ROBERT G. MILLHISER
NICHOLAS PANZICA
BY EMIL UMBRICHT
DEWEY M. EVANS

Curtis, Morris, & Safford
ATTORNEYS

R. G. MILLHISER ETAL 3,146,550

ABRASIVE BLASTING MACHINE

Filed July 7, 1961

INVENTORS
ROBERT G. MILLHISER
NICHOLAS PANZICA
BY EMIL UMBRICHT
DEWEY M. EVANS

Curtis, Morris, & Safford
ATTORNEYS.

United States Patent Office 3,146,550
Patented Sept. 1, 1964

3,146,550
ABRASIVE BLASTING MACHINE
Robert G. Millhiser and Nicholas Panzica, Detroit, Emil Umbricht, Northville, and Dewey M. Evans, Livonia, Mich., assignors to Ajem Laboratories, Inc., Livonia, Mich.
Filed July 7, 1961, Ser. No. 122,521
14 Claims. (Cl. 51—15)

This invention relates to apparatus for performing a succession of treating steps on manufactured parts, etc., and more particularly for holding such parts during such treatment and indexing them to successive positions for successive treating steps.

The invention is particularly advantageous for apparatus of the type adapted for automatic scouring, smoothing, abrading, deburring, descaling, rust-proofing and like processes, and it will be described here in such a process, but it will be apparent to those skilled in this art that in many respects it is applicable to other treating processes and apparatus.

We shall use the term "reforming" herein to include the various surface treatments by which a new surface is formed on a part, or one of its characteristics changed in some respect from those of the part before such treatment. Thus on a sand cast part, the roughness of the sand mold, and adherent particles of sand may be removed; on a die casting, flash may be removed; on a machined part, burrs, sharp edges and tool marks may be removed or smoothed; and on any such parts the surface may be peened by bombardment with steel shot or other hard particles; and if the liquid used carries suitable chemicals the surface may be cleaned of dirt, oxides, coatings, etc. and fresh metal exposed for chemical reaction, e.g., to form integral protective coatings or passivate the metal surface, etc.

The methods heretofore employed for such surface treatment, for example, hand grinding, filing and scraping of each part and also shot or sand blasting with air are expensive and not entirely satisfactory.

The previously used apparatus and methods have been relatively costly of labor and have not eliminated substantial variations in quality. Multiple handling of the individual parts by workmen has not only increased the unit cost but also the possibility of damage to precisely formed parts. Moreover, extensive plant space must be devoted to such treatment, and often dust is a necessary by-product of their operation. This dust, in addition to creating unhealthy working conditions, prevents consolidation of the manufacturing operation.

One object of this invention, therefore, is to provide automatic apparatus to effect a uniform, high quality reforming of manufactured parts at a low cost.

Another object of this invention is to provide an automatic apparatus for transporting parts through a sequence of processing steps.

Another object of the invention is to provide an abrasive deburring apparatus of compact design.

Another object of this invention is to provide an automatic apparatus for surface reforming, wherein dust nuisance is not created by its operation.

Another object of this invention is to provide an automatic appartus which is suitably adapted for reforming of manufactured parts regardless of their complex configuration and/or composition, e.g., metals, alloys, plastics, etc.

These and other objects can be achieved by our invention as illustrated, for example, by an automatic apparatus transporting and continuously or intermittently rotating parts to be treated to and at its successive stations, compartmented so as to isolate the process steps carried on at the respective stations, such as, blasting, flushdown, and blowoff. The operation of such active processing steps are timed by this apparatus and also are positively phased with the indexing and accurate positioning of the parts so as to insure a desired reforming or other effect on the parts.

In accordance with one embodiment of this invention, each part to be treated is supported on a holder positioned on a rotatable carriage. The processing stages through which each part is transported stey-by-step are disposed about the axis of the rotating carriage. The carriage is periodically stepped through a predetermined arc by an indexing mechanism so as successively to position each supported part in proper relationship with the active treating means of each processing stage. Advantageously the treating means in each of the active processing stages is actuated only when the parts are properly positioned. Each part is advantageously rotated about an axis through the part during the treatment in at least some of the stages to insure proper treatment of its entire surface.

As the treating cycle is time-controlled, all parts get a uniform treatment. A number of supported parts may be acted upon in each of the processing stages simultaneously and presented, in turn, fully treated at a last stage for discharge from the machine.

An advantage of this invention is that each of the processing stages, though successively arranged, are compartmentalized during the reforming cycle.

In this specification and the accompanying drawings we have shown and described a preferred embodiment of our invention and have suggested various alternatives and modifications thereof; but it is to be understood that these are not intended to be exhaustive and that many other changes and modifications can be made within the scope of the invention. These suggestions herein are selected and included for purposes of illustration in order that others skilled in the art will more fully understand the invention and the principles thereof and will thus be enabled to modify it and embody it in a variety of forms, each as may be best suited to the conditions of a particular use.

Figure 1:
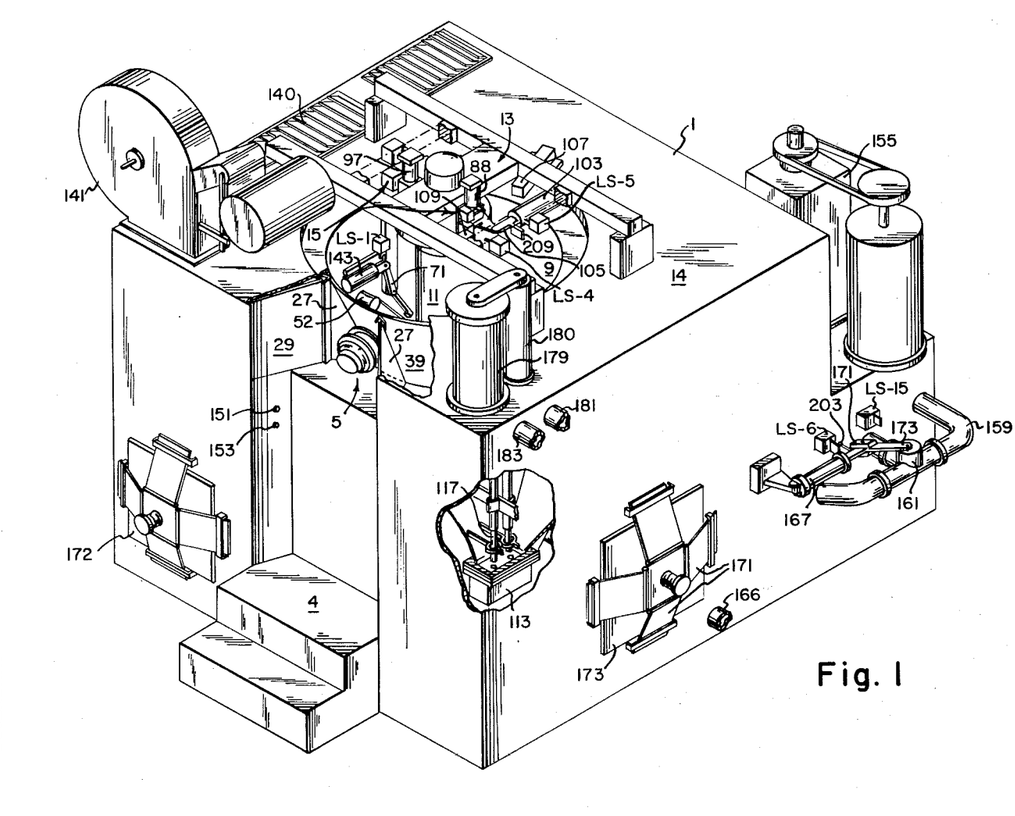
FIGURE 1 is an isometric view of a deburring and washing apparatus in accordance with this invention, partly broken away to show internal structure.

Referring now to FIGURE 1, the apparatus there shown embodying this invention comprises a housing 1 with a loading-unloading recess 3 at the front with a platform 4 where a workman stands to mount parts 5 (FIGS. 4–5) on support arms 7.

The parts supports 7 are mounted on a revolving carriage 9 at uniform arcuate spacing, so that a uniform arc of stepping will bring successive parts to substantially the same position. As hereinafter more fully described, the carriage 9 has a central column 11, the upper end of which is secured by a frame 13 above the roof 14 of the outer housing structure 1.

The carriage 9 is revolved intermittently one arcuate step at a time by an indexing mechanism, generally indicated at 15. Thus parts 5 mounted on supports 7 are carried, in turn, through a number of compartments where they are subject successively to a series of processing steps, hereinafter identified and more fully described. When a part 5 has been carried through all of these processing steps it is brought full cycle again to the recess 3 and unloaded from the support arm 7 by the workman. Immediately, the workman secures another part onto the support 7 for transport through the machine.

Figure 2:
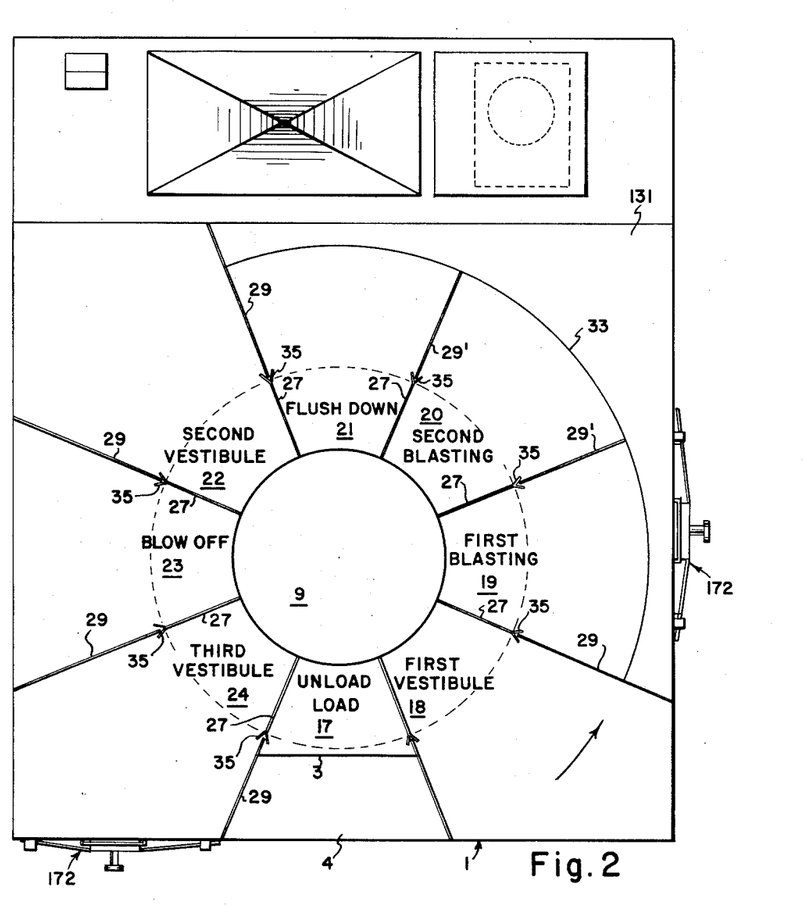
FIGURE 2 is a diagrammatic plan view of the deburring and washing apparatus of FIGURE 1 with the top removed.

The processing steps to which the parts are subjected at the several stations, respectively, are identified in FIGURE 2 as 17: unloading-loading station at recess 3
18: first vestibule
19 and 20: first and second blasting stations
21: flushdown
22: second vestibule
23: blowoff station, and
24: third vestibule.

These processing stations are defined by a series of mating partition members 27–29, which are positioned equi-angularly about the central column 11. Members 27 extend outwardly from and revolve with column 11, while a corresponding series of partition members 29 and 29' extend radially inward from, and are fixed on housing 1 or an arcuate inner housing member 33 (see FIGS. 2 and 4), respectively. The member 33 is secured to the under surface of the roof 14 (see FIG. 4).

Figure 2A:
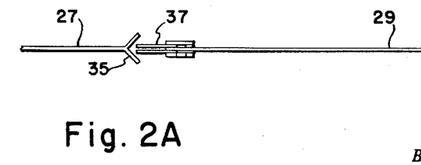
FIGURE 2A is an end view of an internal partition of the deburring and washing apparatus of FIGURE 1 showing a mating seal used to compartmentalize the processing stages of the reforming process.

Each of the partition members 27 is provided on its outer edge with a V-shaped baffle seal 35, as best shown in FIGURE 2A. These seals are of flexible rubber, or like resilient material and long enough so that if any person's hands are caught between the moving and stationary partitions, they will not be sheared but will be accommodated by flexing of these seals. Each of the mating partition members 29 and 29' carries a pair of flexible resilient sealing strips, e.g., neoprene, 37 (FIG. 2A) on its inner edge. These flexible edge strips provide a closer seal than would otherwise be possible, as they freely flex to pass over the edges of mating partition members 29, when carriage 9 is indexed. A pair of the flexible strips 37 is then received within each of the V-shaped troughs 35. During an indexing processes, the neoprene strips 37, being flexible, ride out of the troughs 35 in which they are positioned and, then snap into and remain positioned within the next V-trough 35 on the next adjacent members 27.

Figure 4:
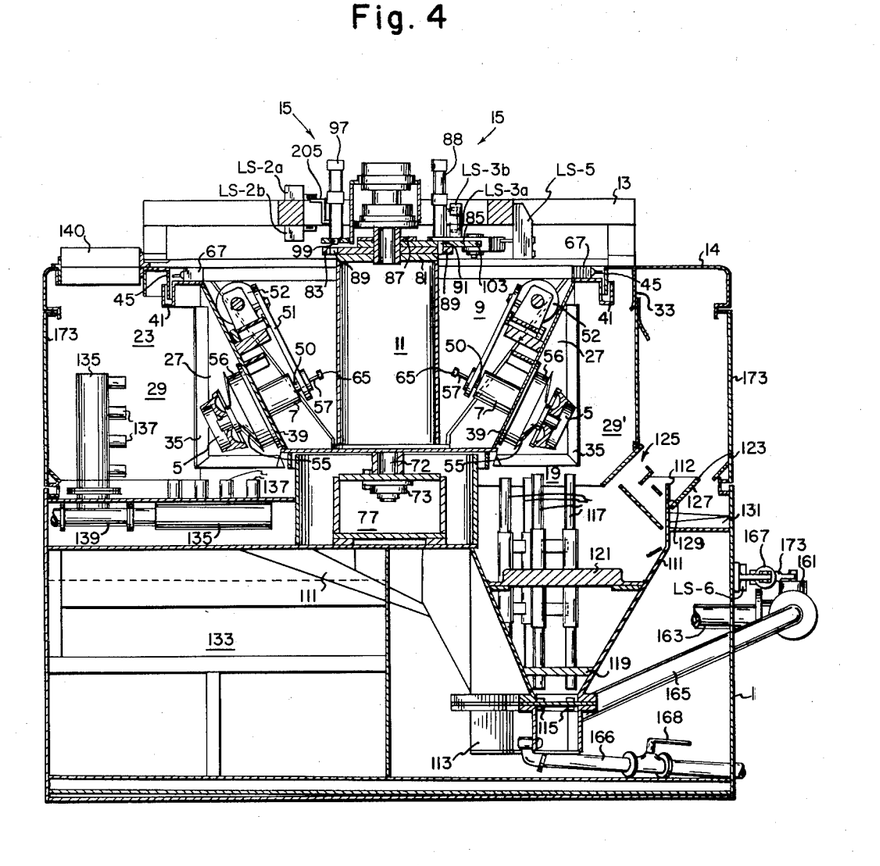
FIGURES 4 and 5 are axial sectional views taken along the lines 4—4 and 5—5, respectively, of FIGURE 3.
Figure 5:
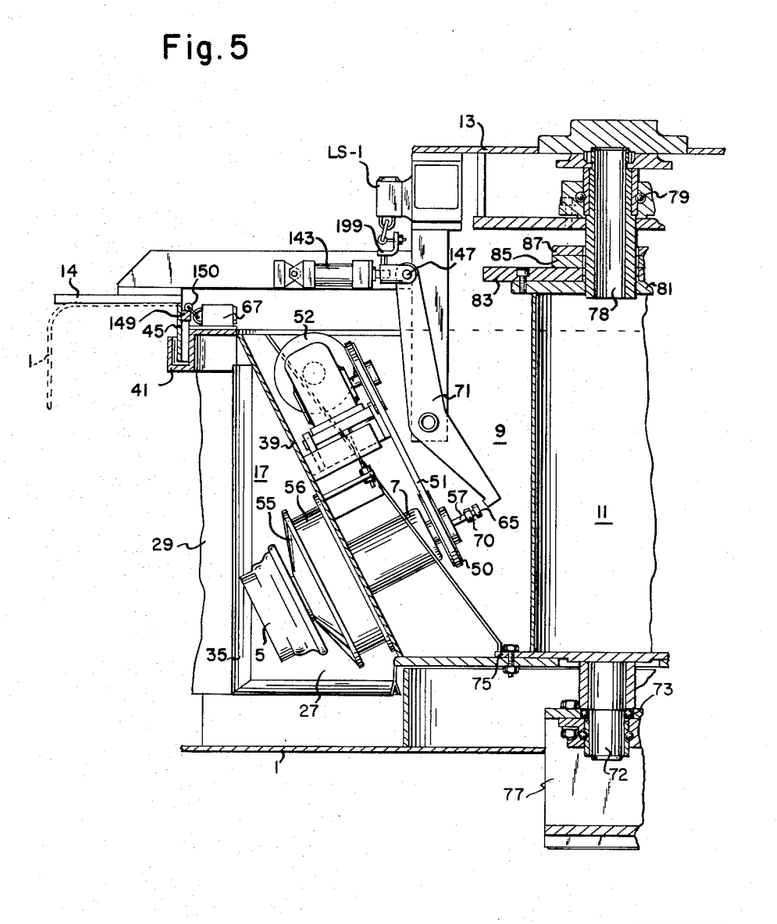

As shown in FIGURES 4 and 5, each of the partition members 27 and 29 cooperate with the face 39, annular sealing trough 41, on the carriage 9, and on the housing 1, roof 14 and sealing lip 45 (in trough 41) all cooperate to form effective compartments for the several processing stations. Thus the treating liquids and all by-products of the various steps of the process are confined within the respective compartments thus formed.

The vestibules 18, 22 and 24 do not constitute active processing steps but, rather, are provided for isolation of the active stations, because of the possibility of treating materials or by-products of the active processing steps, i.e., from blasting stations 19 and 20 or the flushdown station 21, splashing or ricocheting to contaminate either the unload-load station 17 or the blowoff stage 23.

Each part 5, after passing the active processing stations, is advantageously drained and dried in the blowoff station 23 prior to being received back again at the unload-load station 17.

One of the supports 7 is mounted on the carriage 9 between each of the partition members 27. It is evident that the number of support arms 7 as well as the partition members 27, and also 29, corresponds to the number of processing stations. Each arm 7 is adapted to support a part 5 above the lower edges of corresponding adjacent partition members and within the compartments formed thereby.

Figure 7:
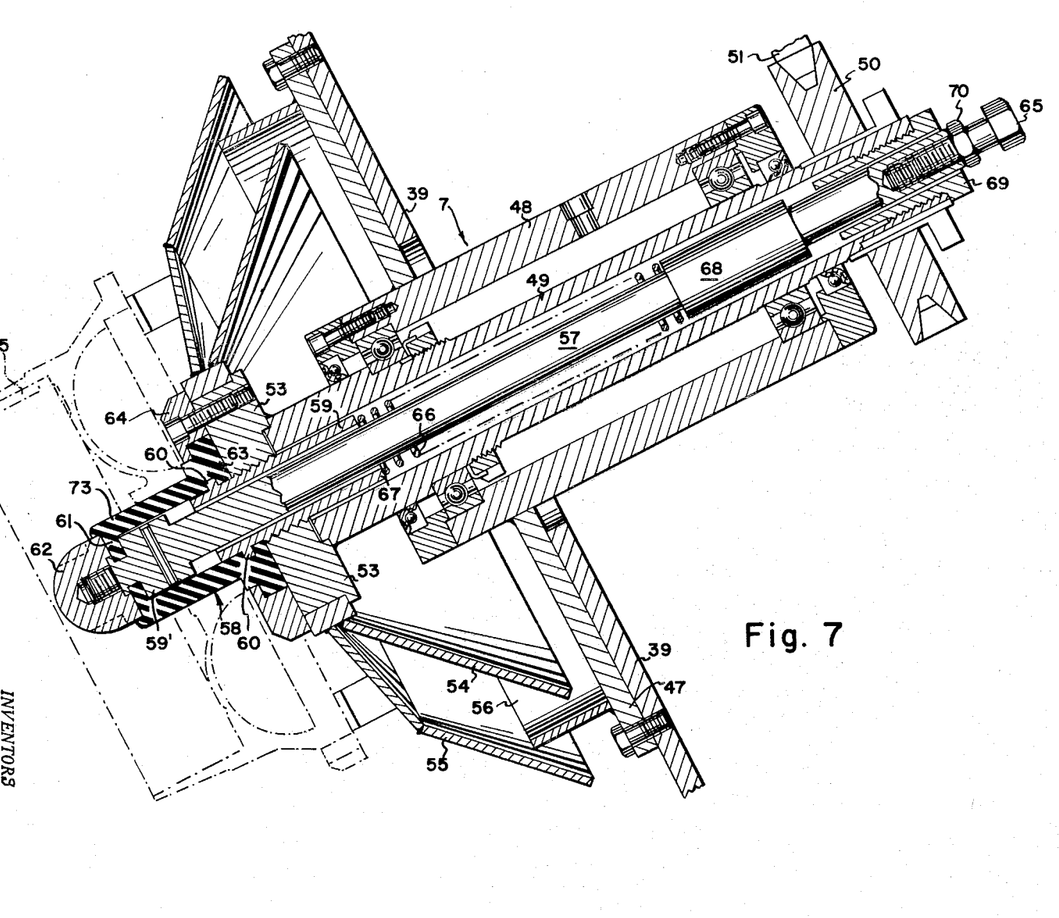
FIGURE 7 is an axial, sectional view on a larger scale of a part support arm, slightly modified from that shown in FIGURES 4 and 5.

A parts support 7 of a type which may be employed in the practice of this invention is shown in greater detail in FIGURE 7. The flange 47 of a tubular housing 48 is bolted or otherwise secured, to wall 39 of the carriage 9. Within this housing is a spindle 49 rotatably mounted in ball bearings. A sheave 50 is mounted in driving connection at one end of spindle 49. Each sheave 50 is driven, in this case through a V-belt 51 by a motor 52 mounted on the wall 39 of carriage 9 (FIGURES 4 and 5). Other devices for rotating such parts using a common motor for all stations are shown in copending applications of Robert G. Millhiser, Ser. No. 112,454 for Scouring and Abrasive Treating Machine and Methods, and Robert G. Millhiser and Peter Kosar, Ser. No. 112,338, now Patent No. 3,044,207 for Power Washer and the Like, both filed May 24, 1961.

On the other end of the spindle 49 a hub 53 is positioned by screw thread. Baffle skirts 54 and 55 are mounted on the rim of hub 53 and extend back onto opposite sides of the fixed annular baffle 56 on flange 47. During operation, the baffles 54 and 55 and 56 intercept spray and ricocheted particles, etc., to keep them in the compartment where they originate and exclude them from the working parts of the supports 7. As shown in FIGURES 4 and 5, the support arms 7 are mounted in an inclined position so that such particles are effectively blocked and readily drop out from the bottom of this shielding arrangement.

Supported for axial movement within the hollow spindle 49 is a push rod 57 for operating the rubber chuck 58 by which parts 5 are engaged. One extremity of the rod 57 terminates in a bolt head 65; the other extremity of the rod 57 extends through a sleeve 59 and a collar 59' pinned to its end. A soft rubber cup 58 which serves for chucking a part 5 on the support 7, is fitted over the collar 59' and sleeve 59; and an annular rib 60 of the internal collar 59 provides tensile engagement with the cup 58. The bottom 61 of the cup 58 fits into a groove at the end of the push rod 57 and is clamped by nut 62. An annular flange 63 on cup 58 is clamped against hub 53 by a ring 64 bolted to the hub 53. The cup 58 and the rod 57 rotate with the spindle 49. Longitudinal movement of rod 57 by means described below, stretches cup 58 to a lesser diameter for slipping part 5 thereon and is compressed to a greater diameter to hold the part for transport and rotation with the spindle 49.

Each motor 52 is normally energized by a switch 67 mounted on the sealing trough 41 (see FIGURES 4 and 5). As hereinafter described, a motor 52 is de-energized only when its respective support arm 7 is positioned in the unload-load station 17, to facilitate an unloading and loading of parts 5.

Normally, the push rod 57 is maintained in its chuck-compressing position by a spring 66 compressed between one face of the sleeve 59 and one face of the enlarged abutment 68 integral on the push rod 57, or a collar 68 can be adjustably fixed on rod 57 by a set screw into the end of spindle 49. As shown, the rod 57 is fully extended.

When the support arm 7 is at the unload-load station 17 a rocker arm 71 engages and pushes down the bolt head 65, as shown in FIGURE 5. At this time, the rod 57 travels forward, overcoming the force of the spring 66, so as to stretch, and reduce the outside diameter of, the rubber chuck 58, whereby a part, previously chucked thereon, is released. The extent of this forward movement of the rod 57 is adjustable by screwing bolt 65 into or backing it out from the end of the rod, after which it is secured by lock nut 70.

When rocker 71 releases the pressure on bolt 65, the spring 66 forces rod 57 back and compresses the rubber chuck 58 to enlarge its diameter. If a part 5 has been positioned with its hub fitted over the rubber 58 it will be securely engaged for transport on the carriage 9.

The support arm 7 as illustrated in FIG. 7 is advantageous for carrying parts having holes of moderate size for receiving the rubber 58, e.g., the hydraulic transmission part shown. However, it is evident that numerous mounting structures, i.e. cradle-type structures, clamp-type structures, mechanical chucks, etc., may be provided in lieu of the rubber chuck to support a part depending upon its particular configuration.

The wall 39 of the carriage 9 (see FIGURES 4 and 5) which mounts the supports 7 and carries the partition members 27 is of truncated conical form and is secured to the column 11. This column 11 has at its lower end a stub shaft 72 mounted for rotation in bearings 73 in the base support structure 77 (see FIG. 5). A base flange 75 on column 11 is bolted to other parts of the carriage 9 as shown.

At the upper end of the column 11 a stub shaft 78 extends above the roof 14 into ball bearing 79 secured in upper frame 13, and is welded to the center of top plate 81 of column 11.

A stepping plate or wheel 83 is secured to the top of column 11, and a swing arm 85 is swingably mounted on the shaft 78 above the indexing plate 83. The swing arm 85 is held on shaft 78 by retainer ring 87.

The indexing mechanism 15 is actuated by supplying fluid under pressure to cylinder 88 to push down its piston rod 91 which extends through a hole in the swing arm 85 to engage in one of the holes 89 in the stepping wheel 83.

At another position on the stepping wheel 83 is a fluid pressure lock 97, the piston rod of which acts as a locking bolt, when pushed into another of the holes 89, to hold the stepping wheel 83, and through it the carriage 9, accurately positioned during each process step.

Figure 3:
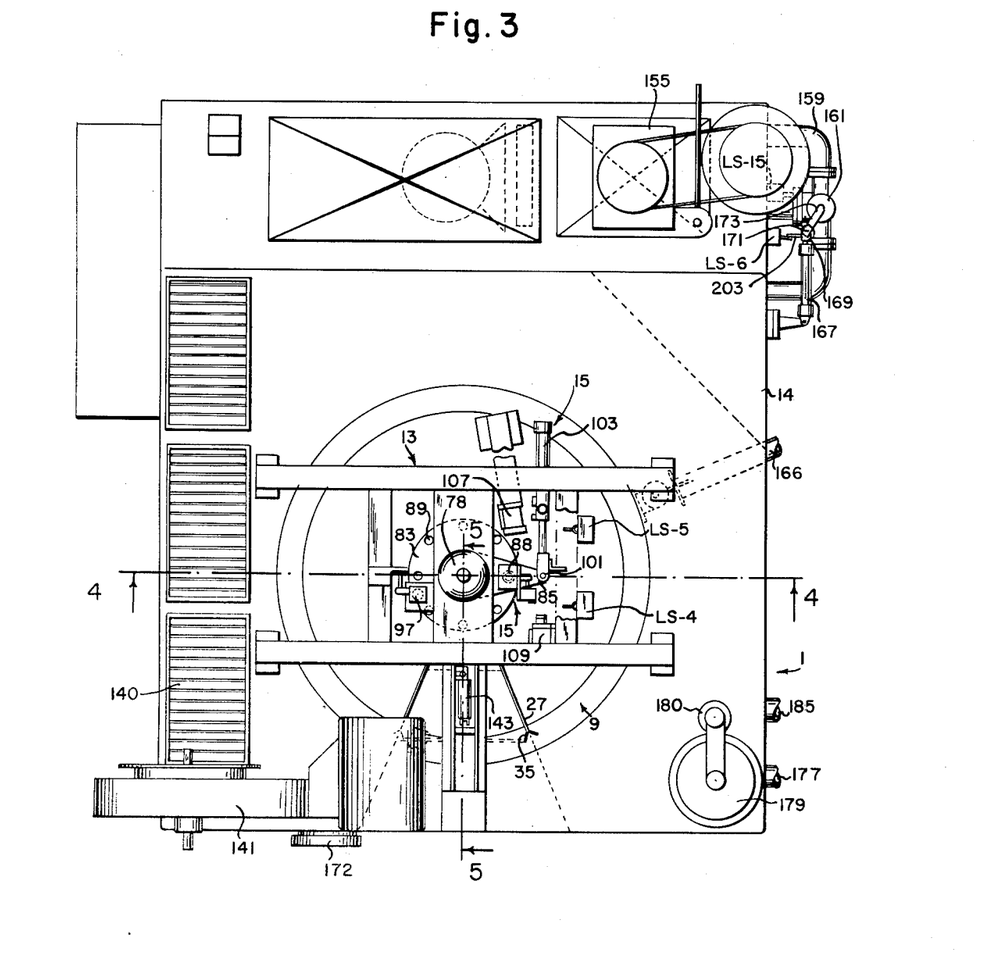
FIGURE 3 is a top plan view of the deburring and washing apparatus of FIGURE 1.

With lock 97 retracted and pin 91 inserted in a hole 89, indexing motor 103, connected to swing arm 85 by a clevis shown in FIGS. 3 and 4, pulls the swing arm 85 through its operating arc, thus indexing wheel 83 to the next position and thereby revolving carriage 9 through the same arc to bring the next part, on holder 7 to each of the stations. In this instance, as eight processing stages are provided, the apertures 89 are spaced on stepping wheel 83 at 45° arcs and located at uniform radial distances from the axis of the column 11. The indexing pin 91 on the swing arm (see FIG. 4) is of corresponding size and at the same radial distance from the axis.

The indexing pin cylinder 88 is vertically positioned on the swing arm 85, with its piston pin 91 extending into the hole in arm 85 when retracted and through said hole into engagement with the stepping wheel 83 when projected, the pin being received in one of the holes 89 whereby the swing arm 85 and the indexing plate 83 are interlocked.

The locking pin cylinder 97 is mounted on the upper frame 13 above the outer part of stepping wheel 83. This locking cylinder 97, when operated, extends its piston rod as a positioning pin through another aperture 89 in the indexing plate 83. The end of the piston rod is bullet-shaped to facilitate accurately positioning in holes 89 of the stepping wheel 83 whereby the supported parts 5 are correctly positioned at their respective processing stations.

When the indexing cylinder 103 is retracted while pin 91 is extended, the swing arm 85 is locked to the carriage 9, and therefore the carriage is rotated through an arc of 45°, whereby the parts 5 on the support arms 7 are respectively carried to their next successive processing stations. The swing of the arm 83 is limited by a bumper stop 107 (see FIGURES 1 and 3) positioned on the upper frame 13.

The indexing pin cylinder 88 is then retracted and a final, accurate positioning and anchoring of the carriage 9 is effected by extension of the locking pin of cylinder 97. Thereupon, the indexing motor 103 is extended to retract the swing arm 85 against a second bumper stop 109 preparatory to a subsequent indexing operation.

*Fluid and Grain Reuse, Hydraulic Classification*

Disposed in that portion of the apparatus designated the "blasting" stations 19 and 20 and the "Flushdown" station 21 (see FIGS. 2, 4, and 6) is a hopperlike sump 111. This sump is shown in FIG. 4 as having sloping sides and at the top a weir edge 112. At the narrowed bottom of the sump a manifold 113 supplies a blasting liquid under pressure, a plurality of blast jets 115 situated beneath the blasting stations 19 and 20, respectively.

The stump 111 may be supplied with surface-reforming grains and a blasting liquid. These grains settle to the bottom of sump 111 around jets 115 where they are entrained in the high velocity jets of liquid forced under great pressure through each of the nozzles 115 from the blast manifolds 113. Ejector tubes 117 are arranged substantially vertically over the jet nozzles one aligned with each of the nozzles 115. Thus the liquid with the surface treating grains entrained are projected upwardly through tube 117 to above the level of the liquid medium contained in sump 111 and then toward and against the part positioned thereover by one of the arms 7. A brace 119 pivotally supports each group of tubes 117 at their lower ends in alignment with nozzles 115 respectively. Also, a clamp structure 121 positions each of tubes 117, at selected angles toward the parts positioned at blasting stations 19 and 20.

The blasting operation with surface-reforming grains has been previously described and claimed in a copending application of Emil Umbricht and Willard Johnson, Serial No. 9,910, filed February 19, 1960, in common ownership with this application and the weir and other features here shown are disclosed in the application of Robert G. Millhiser, Nicholas J. Panzica and Willard L. Johnson for Scalloped Edge on Settling Tank, Ser. No. 125,609, filed May 23, 1961.

The rotation of the parts 5 by the holders 7, while the parts 5 are positioned in the blasting stations 19 and 20 is an important improvement. For reasons apparent from said prior application, it is most satisfactory in such wet blasting with hard granular materials to project the jets vertically against the parts being treated. Therefore, in order to achieve the most effective treating angle on various areas of the surface, it is advantageous to rotate the part to various angles.

The entraining liquid and the spent grains and also some material removed from the parts 5, fall back into the hopper-like sump 111. This drain-back material creates excess liquid within the sump 111 which allows for overflow of the surface liquid near the weir edges 112 with some or all of the dirt and small fragments of broken or worn out grains. The heavier surface-reforming grains settle to the bottom and are returned to the vicinity of jets 115 for reuse. The excess liquid which overflows the weir may be subsequently clarified for reuse.

The surface-reforming grains are subjected to violent impacts and abrasion during the process, whereby their individual sizes are continuously reduced. As the process continues, our apparatus continually separates the particles which have become too fine and carries them off with the overflow, finally removing them in discarded effluent or as sludge by further settling or filtration. To facilitate settling and this hydraulic classification, a baffle arrangement, generally indicated at 125 is provided near the weir edges (see FIGURES 4 and 6).

The baffle arrangements 125, as more fully set forth in said prior applications, comprise a number of flat, rigid members positioned at selected angles along the inside of the weir edge 123. In effect, the baffle structure 125 functions to hinder turbulence and to assure washing of heavier grains in a gentle flow of the liquid, and to bring excess liquid with suspended dirt to and over the weir, whereby the excess liquid overflows smoothly along the entire length of the weir edge 123. In addition, the baffle arrangement 125 causes abrupt changes in flow direction of this excess liquid toward the weir edge 123 whereby the heavier surface-reforming grains and suspended material therein is inertially as well as gravitationally induced to settle into the sump 111.

Also, the effective weir length of the upper edge of sump 111 is increased by providing a series of extensions 127 along the outer edge. The weir edges are disposed at the same level as in the other parts of the sump 111 whereby the rate of flow of the excess liquid over the edges is decreased, due to the increased effective weir length.

The excess liquid, still carrying the more readily suspended matter unsuitable for further recycling in the processes, overflows into a trough 131 which slopes around the sump 111 toward a clarification tank 133. Settling tank 133 is disposed under the vestibule 24, blow off station 23 and the load-unload station 17 and extends under the vestibule stations 18 and 22 and the flushdown station 21. While contained in the settling tank 133, enough of the suspended matter settles out so that in ordinary use the liquid can be recirculated. Further clarification means may be provided for the recirculated liquid.

*Flushdown, Blowoff and Load-Unload*

The individual parts, after treatment in the blasting stations 19 and 20, are transported to and positioned in the flushdown station 21 on a subsequent operation of the indexing mechanism 15. While positioned in the flushdown station 21, the part is subjected to jets of washing liquid directed from a flushdown manifold, not shown. The flushdown manifold may be structurally similar to the blast manifolds 113 and connected to a pressure liquid conduit system 130 of the apparatus by the pipe 134. The washing manifold should be positioned above the level of the liquid medium in the sump 111 and sufficiently clear of the carriage for free rotation thereof. As the part 5 is rotated by arm 7, these jets of liquid remove all residual contaminants which may be left after the blasting treatment. This liquid with any removed contaminants drains back directly into the above-described classification sump 111, where it mingles with drain-back from the blasting stations and eventually returns to the clarification tank 133 via the trough 131 and after clarification is reused.

After this flushdown, each part is transported by further rotation of the carriage through the second vestibule 22 into the blowoff station 23 (see FIGURE 4), wherein each part is subjected to strong blasts of air from nozzles 137 of a pair of air manifolds 135. These air manifolds 135, which may be structurally similar to the blast manifolds 113 and the flushdown manifold hereinabove mentioned, deliver air via ducts 139, partially shown in FIG. 4, from a motor-driven fan 141 positioned at the top front portion of the outer housing structure 1 as shown in FIGURES 1 and 3.

As shown in FIGURE 4, one air manifold 135 is horizontally positioned below the level of the lower edges of partitions 27 and the other air manifold 135 is vertically positioned beyond the radial edges of the rotating partition members 27, whereby the blasts of air are directed over the entire surface of rotating part 5. The baffle 55 on each support arm 7 also deflects this blast of air onto the rear surface of the part 5.

The vertical positioning of a blast manifold is feasible here, as the arcuate inner housing 33 need not extend about this portion of the apparatus. As a result of the blowoff steps, parts 5 arrive at the unload-load station 17, clean and dry and ready to be used or packaged as desired.

Exhaust air from the blowoff station 23 is directed through moisture-eliminators, e.g., louvers 140 positioned in the roof 14 over the blowoff station 23, or other air treatment before reuse or discharge.

Upon subsequent operations of the indexing mechanism 15, the part 5 is transported on its respective support arm 7 through the third vestibule 24 and finally is positioned at the unload-load station 17. See FIGURE 5.

At this time, the motor 52 associated with that support arm 7 which is positioned in the unload-load station 17 is de-energized by a switch operating control bar 149 (FIG. 5). The control bar 149 is mounted along the inside of the annular ring 45 above the unload-load stage 17, where it engages a finger of the normally closed switch 67 for motor 52 as its support arm 7 is carried into the unload-load position at 17. The ends of the control bars 149 are beveled to cam the rollers on the switch-operating fingers 150.

When the part 5 returns to the unload-load station 17, it is released from the support arm 7 by operation of the chucking motor 143. To do this, the operator presses a chuck release button 151 located inside the recess 3 (FIG. 1). This button controls a fluid pressure supply line to the chucking motor 143 to extend its connecting rod and thereby rock the centrally-pivoted arm 71 so that its other end presses the bolt 65 and thereby stretches the rubber chuck 58 until it releases part 5.

The motor 143 is fixedly positioned on the upper frame structure 13 above the unload-load station 17 and is connected to arm 71 through a clevis 147.

When the treated part has been removed, and another part fitted onto the chuck, the chucking motor 143 is retracted by pressing a valve control button 153 located near the chuck release button 151 in the recess 3. The rocking arm 71 is thus released and allows the bolt 65 and rod 57 to retract, whereby the rubber chuck 58 expands to securely engage the newly-fitted part 5 onto the support arm 7. This part is then transported by subsequent operations of the indexing mechanism 15 through the successive processing steps at the successive stations in the manner hereinabove described.

*Liquid Conduit System*

The conduit system, illustrated in FIGURE 4, for supplying liquid under pressure to the blast manifolds 113 and also the flushdown manifolds, comprises a motor-driven pump 155 positioned on a rear shoulder of the housing 1 as shown for example in FIGURE 1.

The pump 155 (FIGS. 1 and 6) is preferably a large capacity high pressure type such as that described in the copending application of Emil Umbricht, Serial No. 143,355, filed October 6, 1961, so as to force large quantities of liquid through the pressure liquid conduit system 130 and pipe 114 to the blast manifolds 113. Conduit system 130 is also connected to the flushdown manifold for supplying liquid under very high pressure to produce the desired wash-down jets. The impeller of the pump 155 drains its intake from clarification tank 133 and pumps it into a large diameter pipe 159. A diverting valve 161 is located in the pipe line 159 to direct liquid impelled by the pump 155 either along a by-pass pipe 163 (shown partially in phantom in FIG. 6) back to the clarification tank 133 or through a pipe line 165 and to the blast manifolds 113 connected along the pipe 114 and also the flushdown manifolds. The diverting valve 161 may, for example, be of the type described in the copending application Ser. No. 67,396, filed November 4, 1960.

Although most of the suspended matter carried by the overflow from the sump 111 will have settled out before the liquid is drawn into pump 155, and sent to valve 161, the working parts of conventional valves might be damaged, whereas the valve of said prior application is specially designed and proven for this work.

Figure 6:
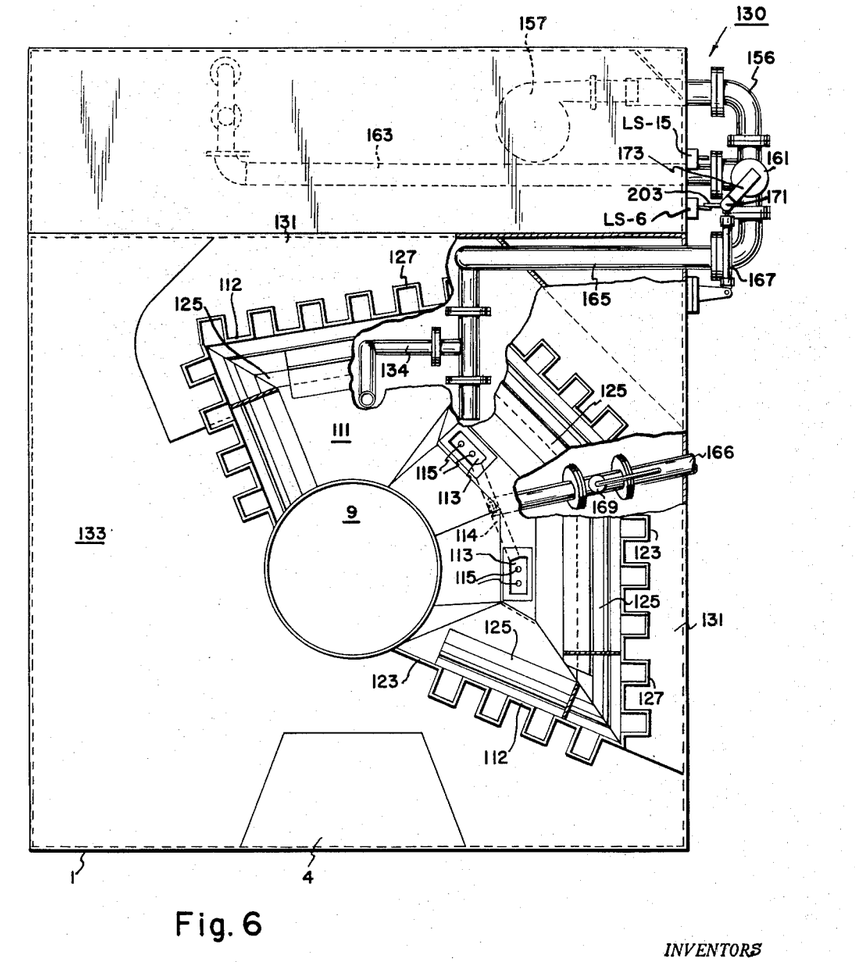
FIGURE 6 is a diagrammatic plan view with some parts removed, some shown in section and others broken away for clearer showing of the sump and weir system of the deburring and washing apparatus of FIGURES 1–5.

The diverting valve 161 is operated by a cycle timer and hydraulic cylinder motor 167 positioned on the housing 1 (see FIGS. 1 and 6). The piston rod of this motor 167 is connected by a clevis to the control arm 173 of the diverting valve 161. During the operation of the indexing mechanism 15, the timed motor 167 pulls back on the arm 173, whereby liquid in the conduit system is returned to the settling tank 133 through the by-pass 163 by the diverting valve 161. However, during the treating steps, the cylinder 167 pushes out on lever 173 and the liquid is then directed along the pipe line 165 to the blasting manifolds 113 and the flushdown manifolds. This diversion of the liquid by the valve 161 is very advantageous as it avoids too violent shocks and "water hammer" effects which often result from turning on and off the flow from a high pressure line of motor-driven pump. Moreover, it helps to maintain the liquid pressure constant within the conduit system; yet there is no liquid sprayed and splashed around in the apparatus through openings in the partition members during the indexing of the carriage 9.

In order to drain the liquid from the manifolds, a drain pipe 166 including a normally closed valve 169 connects to the pipe 114 and leads off through the outer housing structure. A similar arrangements, not shown, is also provided to drain the settling tank 133. Various access doors, e.g., as shown at 172 and 173, may be provided in the front and/or side walls of the housing for servicing the apparatus. The access door 172 provided with gaskets, not shown, and clamps 171 provides a water-tight closure on a convenient opening through which sedimentation in the settling tank 133 may be cleaned out. Such sedimentation should be removed periodically to insure that a minimum amount of abrasive matter is carried through the liquid conduit system, and especially to the pumps and valves.

*Indexing Operations*

Figure 8:
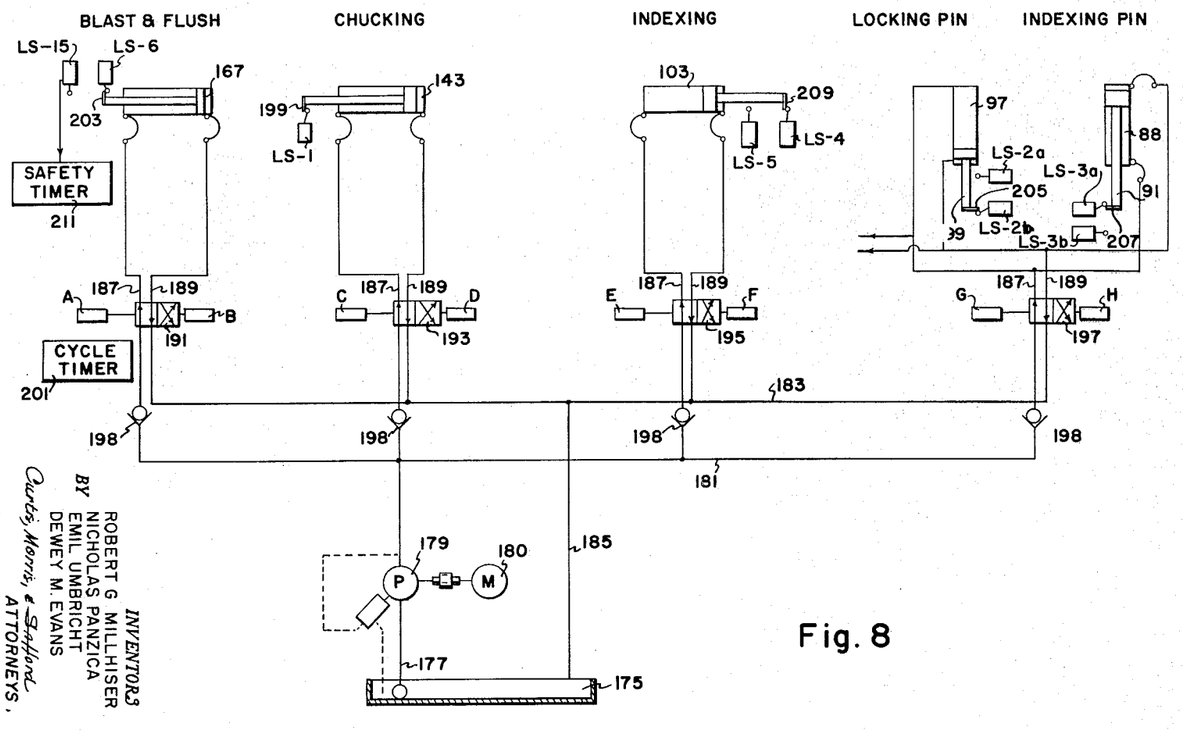
FIGURE 8 is a schematic representation of the process steps at the several stations and of the operation of the hydraulic system of the deburring and washing apparatus of FIGURE 1.

The hydraulic system for controlling the indexing of the apparatus is shown schematically in FIGURE 8. Any type of cycle timer apparatus can be used, electrical, mechanical, hydraulic or pneumatic. To simplify the presentation of the hydraulic system here illustrated, the liquid connections and also solenoid-operated control valves associated with the hydraulic cylinders of the indexing pin motor 88, locking pin motor 97, indexing motor 103, chucking motor 143 and the blast and flush motor 167, respectively, have been shown schematically; the arrows included within each of the control valves indicate the particular cross-connections effected by the valves in response to the energizing of their respective solenoids and the directions of hydraulic flow through the valves. The solenoids are of the full-operating type, which when once energized, complete the operating stroke without conscious checking by the operator.

The hydraulic system of this invention includes a liquid reservoir 175 (bottom of FIG. 8) from which liquid is drawn by a pump 179 operated by motor 180 (upper right forward portion of housing 1, FIG. 1). The hydraulic fluid under pressure from the pump 179 is distributed by a pressure manifold 181 (see FIG. 8), and after use in the various hydraulic motors it is returned to the fluid reservoir 175 through a return manifold 183. The pressure manifold 181 and the return manifold 183 are connected along the way to the various motors by hose connections 187 and 189. Control valves 191, 193, 195 and 197 are interposed to reverse the flow to any of the motors so that they can be operated either to extend or retract. A check valve 198 is included in the pressure line to each motor. A by-pass indicated by a broken line and having a pressure release valve 190 is connected from the output line of pump 179 and discharges back into the reservoir 175 whenever the output pressure exceeds the desired working pressure.

*Cycling Controls*

Figure 9:
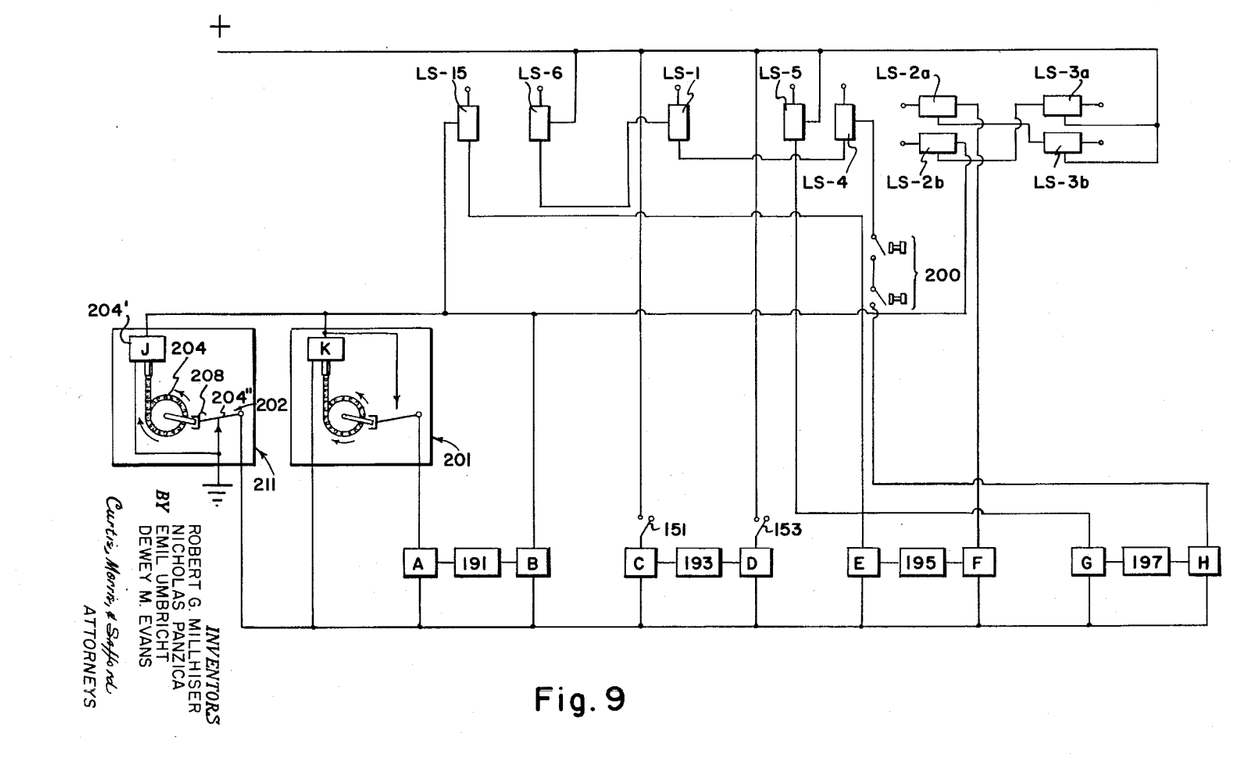
FIGURE 9 is a schematic represenation of the electrical controls of the apparatus of FIGURE 1.

Assuming, for purposes of description, that the chucking motor 143 has been extended, as shown in FIG. 7, to stretch and attenuate the rubber chuck 58, by rocking the arm 71 to press it against the bolt head 65, and that an untreated part 5 has been slipped onto the rubber chuck 58 of the support arm 7, presently at the unload-load station 17, the chucking button 151 at the unload-load station (see FIGS. 1 and 9) is pressed by the workman, which energizes the solenoid C.

When energized, the solenoid C (FIGS. 8 and 9) operates the control valve 193 to retract the chucking motor 143. Specifically, the control valve 193 connects the pressure manifold 181 through the connection 187 to the left side of the chucking cylinder 143 (as shown on FIG. 8) and, concurrently connects the return manifold 183 through the connection 189 to the right side of the chucking cylinder 143. The resulting retraction of this cylinder 143 swings the rocking arm 71 to the position shown in FIGURE 5 whereupon, the rubber cup 58 expands radially so as to hold securely the part 5 on support arm 7.

When the chucking motor 143 is fully retracted, a flange 199 carried on its connecting rod engages and closes a switch LS-1, which cooperates with the already closed series-connected switches LS-4 and LS-6 to energize the solenoid H, to move valve 197 to the left (FIGS. 8 and 9), thereby to actuate motor 97 for retracting the anchor pin on its piston rod, and to acuate motor 88 for setting the driving pin 91 for an indexing step.

A pair of normally open palm button switches 200 and the series connected with switch LS-1 which is opened when chucking motor 143 is extended, and the switch LS-6 which is open when the motor 167 is extended, are all in series with valve-operating motor H, and thus preclude operation of valve 197 by solenoid H until the machine is ready for indexing and the workman has both hands on the buttons 200 out of danger from the rotating carriage.

At this stage of operation, the locking pin cylinder 97 is extended and the indexing pin motor 88 is retracted so that the carriage is fixed in its proper position for treating steps. Thus the flanges 205 and 207 carried on their respective connecting rods engage and hold closed the switch LS-3b and LS-2a, respectively. These switches cooperate to energize a solenoid F so as to reverse the connections through the control valve 195 (i.e. the valve is shifted to the left as shown in FIG. 8) thereby to retract the indexing cylinder 103 and thus to swing the arm 85, and with it the stepping wheel 83 and carriage 9, in a clockwise direction about a 45° arc. This moves all of the parts 5 forward to the next stations, respectively. This forward movement of the arm 85 which is limited by the stop 107, opens switch LS-4 and closes switch LS-5, whereby to set the locking pin 99 and pull the indexing pin 91 preparatory to returning of the indexing arm 83. A flange 209 carried on the connecting rod of the indexing cylinder 103 at the end of its retractive stroke, engages the switch LS-5 and closes it to energize the solenoid G to push the control valve 197 back to the position shown in FIG. 8, in which the locking pin motor 97 is extended and, the indexing pin motor 88 is retracted. (Note that in FIG. 3, 103 and 85 are shown at mid stroke, and 97, with its anchor pin 99 is between holes 89. At the end of the stroke, 99 will be aligned with one of the holes 89.) The locking pin on motor 97 thus is engaged in one hole 89 of the stepping wheel 83, exactly positioning and locking the carriage 9 for the several treating stations; and the indexing pin 91 is withdrawn by simultaneous operation of motor 88, freeing the arm 85 to return for positioning over the next hole 89. At the same time the flanges 205 and 207 engage and close the switches LS–2b and LS–3a, respectively. These switches, being connected in series, cooperate to energize the solenoid B which operates the control valve 191 to extend the blast and flush valve cylinder 167, thus forcing the arm 173 of the diverting valve 161 forward (see FIG. 6), whereby liquid is now directed along the pipeline 165 to the blast and flushdown manifolds for blasting the parts 5 at stations 19 and 20 and washing the parts at station 21.

A flange 203 on the blast and flush valve motor 167 closes a switch LS–15, which cooperates with the already closed switches LS–3a and LS–2b to energize the solenoid E and to set the delay device in the safety timer 211, and the delay device in the cycle timer 201.

Solenoid E then positions the control valve 195 to extend the indexing motor 103 to return arm 85 against the stop 109 preparatory to another indexing movement of the carriage 9. (See FIGURE 3.)

During this operation of motor 103, a flange 209 on the motor closes the switch LS–4, but since LS–6 has been opened by operation of motor 167 and palm buttons 200 are open, solenoid H is not operated until later.

In addition, the switch LS–15, on operating, both energizes the cycle timer 201 to control the duration of the treatment step at the various stations in this position of the carriage, thus insuring identical processing of the parts 5 after each step of the carriage 9, and may, start a spring-operated safety timer 211, which after a time in excess of the normal step time acts to shut down the whole apparatus, to insure that the parts being treated are not damaged and treating materials are not wasted by continued operation if one of the switches or solenoids should fail.

When the cycle timer 201 comes to the end of its preset period, it energizes the solenoid A to operate the control valve 191 so as to retract the blast-and-flush cylinder 167 and return the arm 173 of the diverting valve 161, whereby the pressure liquid is again by-passed to the reservoir and the liquid in the apparatus drains back to the sump 111 and the settling tank 133, and the apparatus remains temporarily inoperative until the workman pushes the palm buttons 200 to start indexing.

As the motor 167 is retracted, a flange 203 (FIG. 8) on its connecting rod engages and closes switch LS–6. As this switch is connected in series with switches 200, there is no immediate effect; but as soon as another part 5 has been chucked on the next support 7, and the operator has pushed button 151, the operation of the chucking motor 143 will engage and close switch LS–1, whereupon the circuit to solenoid H is completed and it operates valve 197 to initiate another cycle.

Each indexing step brings a support 7 into position in the unload-load station 17, and shuts off its associated motor 52, as hereinabove described. The release button 153 must then be pressed, energizing a solenoid D and thus operating control valve 193 to actuate the chucking motor 143, in order to release the treated parts for removal.

It is to be noted (FIGS. 5, 8 and 9) that the clamp cylinder 143 is extended only when the release control button 153 is pressed and is retracted only when the clamp control button 151 is pressed. This insures that that the machine will not index while the workman is removing or mounting a part on the carriage. Each part to be treated is properly positioned on support 7 and the workman's hands safely pressed against the palm buttons 200 prior to the indexing of the carriage 9. However, if a part has been properly positioned on the support 7 and the clamp control button pressed by the workman, so as to operate solenoid C to cause the chuck 58 to engage part 5 and switch LS–1 to be closed, prior to the completion of the period predetermined by the cycle timer 201, the next indexing of the carriage 9 can be initiated immediately when the period of the cycle timer is completed so that it closes the circuit to energize solenoid A and thereby operate valve 191 to cut off fluid flow and to close switch LS–6 and complete the circuit through the already closed switch LS–1. Pressing both palm buttons 200 initiates indexing if the period of timer 201 is complete.

The safety timer is shown diagrammatically as a main switch 202, which controls the power to all of the central solenoids and also to the various motors in the apparatus. This switch can be operated manually at all times by a handle represented on the drawing at 208, but is normally controlled by a delay timer 204. As representative of the many such timers which are available, we have indicated at 204 a spring-driven escapement-delayed mechanism automatically set at the beginning of each step for the predetermined delay by a solenoid 204' which stresses the spring and resets the switch-operating arm 204". As this delay runs out, the arm 204" swings around, like the hand of a clock until it reaches the point where it breaks the switch. In order that the break may be sudden, and arcing minimized, a toggle switch is advantageously used.

If the safety timer 211 should come to the end of its pre-set safety limit before the blast-and-flush valve motor 167 is retracted, i.e., while switch LS–15 is still closed, the entire apparatus is shut down.

We claim:

1. An apparatus for surface treatment of manufactured parts comprising a housing means, a revolving carriage positioned within said housing means and carrying a plurality of radially extending support means, each adapted to carry a part to be treated and including means for rotating said part, partitions on said revolving carriage extending between said support means and forming with said housing means separate compartments for enclosing said parts during successive steps respectively of said treatment, indexing means for intermittently moving said revolving carriage step-by-step, so that said parts and said partitions are carried along predetermined arcs of travel into positions for compartmenting said treating steps, and treating means for effecting said successive steps of the treatment, at least some of said treating means subjecting said parts to the action of granular material entrained in high velocity liquid jet streams and said treating means being positioned within said housing means adjacent but clear of the path of rotation of said parts on said revolving carriage and adjacent said positions of the compartments for said treating steps, respectively, said support means being rotatable to present the part carried thereby in various aspects to said jet streams, and shielding means for each of said support means for shielding against penetration of foreign matter into working parts thereof, said shielding means comprising a pair of conical skirts affixed to said support means and extending towards the wall of said compartment and a ring baffle on said wall extending between said skirts.

2. A surface reforming apparatus for treating manufactured parts with granular material entrained in high velocity liquid streams which comprises a housing, a revolving carriage within said housing, a plurality of support means thereon extending outwardly therefrom relative to the axis of revolution of said carriage for transporting said parts through said apparatus, said support means including means for rotating said parts, a plurality of means for treating said parts for surface reforming, said treating means comprising elements disposed within said housing and adjacent to, but beyond, the revolving carriage, means for indexing said carriage so as selectively to position each of said support means with respect to each of said treating means in turn, means for inhibiting the operation of said treating means during the operation of said indexing means, first partition members fixedly positioned at uniform arcuate spacing on said carriage between adjacent said support means and extending outward to substantially uniform radial distance from the axis of revolution thereof and second partition members extending radially inward from said housing with the same arcuate spacing and to substantially the same radial distance from the axis of revolution, whereby to mate with the first partition members on each selective positioning of said support arms, and thereby to effect each reforming step in a resulting compartment, one of said first and second partition members at each arcuate position having a trough-like seal along its mating edge and the other of said partition members having a flexible strip along its mating edge for being received in said trough-like seal at each selective positioning of said carriage.

3. An apparatus as defined in claim 1 wherein said treating means includes means for directing jet streams of treating liquid in predetermined directions in fixed relations with respect to some of said compartmenting positions so as to impinge upon surfaces of said parts to be treated and means for directing jet streams of washing liquid into others of said compartmenting positions so as to impinge upon the treated surfaces of said parts carried into position by said carriage.

4. An apparatus as defined in claim 1 wherein said treating means includes means for intermittently interrupting at least some of said jet streams during revolving of said carriage and for operating said jet streams between steps of said revolving whereby the operations of said indexing means and said jet streams are mutually exclusive.

5. An apparatus as defined in claim 1 further including sump means below said compartments for receiving drainback material therefrom.

6. An apparatus as defined in claim 5 wherein the sump means comprises a weir dividing said sump into a settling basin for settling out entrained solids and a clarified liquid reservoir, with said weir limiting to clarified liquid the overflow from the settling basin, and means for driving liquid from said reservoir again in said jet stream against the part held in said compartment.

7. An apparatus as defined in claim 6 wherein the means for driving the liquid from the clarified liquid reservoir comprises high pressure pumps and ejectors disposed in the base portion of said settling basins and connected to said pumps for forming said jet streams and entraining therein surface-reforming grains collected in the base of the settling basins, said ejectors extending above the liquid level in said basins for directing said jet streams upward into the respective compartments.

8. An apparatus as defined in claim 7 further including jet nozzles connected to said pumps and adjacent to and directed toward the parts in others of said compartments, respectively, for directing said jet streams of clarified liquid against the part for washing its surface.

9. An apparatus as defined in claim 2 wherein one of said first and second partition members at each arcuate position has a flexible strip along its inner edge, said strips being adapted to seal substantially the joint between the two partition members but, by flexing, to allow them to pass during revolution of the carriage.

10. An apparatus as defined in claim 2 wherein a portion of said housing between predetermined ones of said partition members defines an unload-load position and the portions between them and the next partitions define vestibules in which no liquid treatment occurs.

11. A deburring apparatus as defined in claim 10 which further includes means for deenergizing said rotating means of each of said support means while positioned at said unload-load stage.

12. An apparatus as defined in claim 2 wherein said indexing means includes a stepping wheel connected to said carriage for rotation therewith, a swing arm pivoted coaxially with said wheel, interlocking means for engaging said swing arm with the stepping wheel and disconnecting for return during each indexing operation, driving means for said swing arm adapted to return after each operation thereof, and means for locking said wheel in predetermined position after each indexing movement during the treating step and said return.

13. An apparatus as set forth in claim 1 wherein blow-off means for drying said parts after said reforming treatment is provided adjacent one of the last compartment positions.

14. An apparatus as defined in claim 13 wherein certain of said compartment positions, which serve as vestibules to prevent contamination from one of said treating steps to another, have no treating means adjacent them.

References Cited in the file of this patent

UNITED STATES PATENTS

| | | |
|---|---|---|
| 1,875,994 | Davis | Sept. 6, 1932 |
| 2,629,207 | Gladfelter et al. | Feb. 24, 1953 |

FOREIGN PATENTS

| | | |
|---|---|---|
| 4,217 | Great Britain | Mar. 21, 1887 |
| 147,055 | Germany | Dec. 31, 1903 |